No. 769,123.

Patented August 30, 1904.

UNITED STATES PATENT OFFICE.

FREDERICK J. WARREN, OF NEWTON, MASSACHUSETTS.

ASPHALT PAVING-CEMENT.

SPECIFICATION forming part of Letters Patent No. 769,123, dated August 30, 1904.

Original application filed January 9, 1901, Serial No. 42,627. Divided and this application filed July 17, 1903. Serial No. 166,018. (No specimens.)

*To all whom it may concern:*

Be it known that I, FREDERICK J. WARREN, a citizen of the United States, and a resident of Newton, in the county of Middlesex and State of Massachusetts, have invented a new and useful Improvement in Asphalt Paving-Cements, of which the following, being a division of my copending application, filed January 9, 1901, Serial No. 42,627, is a full, clear, and exact description.

The present methods of making and laying asphalt pavements or structures of any kind for street, sidewalk, and similar surfacings are expensive and require to be carefully practiced by skilled workmen, and if extraordinary care is not employed an inferior pavement is obtained. One of the principal reasons for this large expense and the use of so much care is because the asphalt cannot be worked and the asphalt paving compositions cannot be laid excepting at a high temperature—about 400° or 450° Fahrenheit being a common one—and under the most favorable atmospheric conditions. The expense is occasioned by the quantity of fuel required to heat the asphalt or asphalt composition and to keep it heated while it is being mixed and laid and in mixing, handling, and laying it in its heated state. Any negligence to maintain these conditions of high temperature produces poor work. The natural asphalt is usually prepared for use in making the paving composition in advance of the time of its use, and as so prepared is known as "asphalt cement." It consists of natural or other asphalts, which in their natural or other state are hard, brittle, and unsuitable for use in the manufacture of a pavement, and a reducing agent, which imparts to the asphalt relatively soft, homogeneous, tenacious, and coherent qualities of a permanent nature and which are not dissipated by the heat required to liquefy the cement in the manufacture of the paving composition itself or in the laid pavement. This reducing agent or "flux," as it is sometimes called, is usually a heavy non-volatile oil, the one most commonly used not containing more than three per cent. which will evaporate at 400° Fahrenheit. The use of this flux ne-
cessitates the employment of high temperatures to effect the necessary homogeneous union of the asphalt and the oil in the manufacture of the cement and also in the subsequent liquefying of the cement in the manufacture of the paving composition and while the pavement is being laid.

My invention has for its object an improvement in the method of making the asphalt cement, an improvement in the cement itself, and an improvement in the asphalt paving composition, whether made directly from my improved cement or simultaneously with the making of such cement from the hard or natural asphalt. These improvements I practice by means of an agent which enables the hard asphalt and its permanent flux to be combined at a lower temperature than is now usually practical and which permits the cement so made to be used and worked at the time of the making of the paving composition at a lower temperature than is now prudent and which produces the same results if the hard asphalt and flux are combined at the time the paving composition is made and used and which allows the pavement to be laid at a lower temperature and under less favorable conditions of the atmosphere than are now necessary and are more sure of producing a perfect pavement because of the superior conditions under which it is made and laid.

My improvement also is advantageous in that it reduces the cost of making the cement and the paving composition and of laying the pavement. This comes from the saving in fuel which it occasions, from the use of less complicated and expensive machinery arising from the fact that the cement and composition are handled at lower temperatures, from the saving obtained from the use of less skilled help in the manufacture of the composition and in the laying of the pavement, and from the obtainment of more uniformly satisfactory results.

To practice my invention, there is combined with the hard asphalt and its permanent flux an agent which I term a "temporary liquefier and fixer" and the purpose of which is to very much reduce the high temperature at which the asphalt and its permanent flux may be combined, either in forming the cement in advance of the time of its use, in making the paving composition, or at the time the paving composition is made and also in reducing the high temperature at which the paving composition is made and at which it is worked and laid. This temporary liquefier and fixer must have these properties:

First. It must readily combine with the asphalt, permanent flux, and such other paving ingredients as are used.

Second. It must materially reduce the temperature at which the asphalt, permanent flux, and other ingredients for forming the pavement are combined.

Third. It must possess high volatility and to a very considerable extent become dissipated without injuring the asphalt or its flux or any of their properties, combined or uncombined with other paving ingredients, in order that after serving its purpose as a temporary liquefier it may then serve as a quick fixer for permitting the rapid stiffening or hardening of the laid pavement and without taking from the laid pavement any of the qualities imparted to it by the asphalt and permanent flux, but rather giving to the finished pavement a desirable quality or condition which it does not now possess in that it provides a longer interval of time in which the pavement may be reduced to its permanent or final state, and thus enables its solidification to be continued for a longer period than is now possible.

Any temporary liquefier or fixer which possesses the above qualities may be employed at any time. I mean that it may be used in the manufacture of the asphalt cement, which of course produces a new cement. It can be used at the time that the paving composition is made—that is, the hard asphalt, permanent flux, and temporary liquefier and fixer may be combined together at the time of the laying of the pavement and with or without other paving ingredients. I would mention among the desirable temporary liquefiers and fixers the various light oils having a low evaporating-point—such as naphtha, benzin, and other similar coal-tar light oils or other rapid-drying oils. The proportion of the temporary liquefier and fixer to the asphalt cement depends upon the temperature at which it is united with it and also upon the degree of hardness of the pavement which it is desired to obtain and the time in which it is necessary to obtain such hardness after the pavement has been laid. The ordinary limits of this proportion must therefore necessarily vary considerably. Ordinarily a proportion of five to fifteen per cent. in weight of the temporary liquefier and fixer as compared with the amount in weight of the pure bitumen employed in the cement would serve the purposes of my invention; but I would not be understood as confining myself to the proportion of the temporary liquefier and fixer, as for some purposes a somewhat lower percentage may be used and for other purposes a higher percentage. I would here state that the larger the proportion of the temporary liquefier and fixer to the amount of bitumen in the cement the greater its fluidity at a low melting-point, and where it is desired to employ a mixture that shall flow readily at atmospheric temperatures quite a large additional percentage of the temporary liquefier and fixer must be used.

The percentage of the permanent flux used in my improved compositions is preferably that which is now ordinarily used for obtaining the standard asphalt cements of the market which are used for the same purpose. This proportion is generally from eight to twenty-two pounds of a permanent flux of standard petroleum residuum to one hundred pounds of asphalt of the standard of the Trinidad Lake refined brand.

I have indicated that my invention will be practiced in making a cement employing the temporary liquefier and fixer in using it for a pavement composition either alone or admixed with any paving ingredients; that it will be practiced if the hard asphalt, permanent flux, and temporary liquefier and fixer are combined for use either with or without other paving ingredients at the time of the laying of the pavement, and that it will be practiced in laying a pavement containing as a constituent said temporary liquefier and fixer. The compositions of which my invention may form part and the processes by which my invention may be combined with the paving ingredients are too numerous to be mentioned.

I would here say that by "asphalt cement" I do not necessarily mean the cement prepared in advance of use as a commercial article of manufacture, but any composition whether of the hard asphalt of any kind combined with a permanent flux and with a temporary liquefier or any asphalt having the properties of the hard asphalt and permanent flux combined with the temporary liquefier and fixer and whether further combined with any paving ingredients or not so combined. Some of these combinations of my improved cement and other ingredients would constitute an asphalt mastic. Mixtures with other forms of ingredients would form asphalt compositions. Mastics include the finer earthy or mineral paving ingredients, such as are suitable for furnishing wearing-surfaces of pavements, and in referring to "asphalt mastics" I mean this form of paving composition. This, however, is only one form of the many compositions which are used in making a pavement, and the asphalt cement may be combined with any size, shape, and kind of the earthy and mineral and stony ingredients which are used in the manufacture of pavements either for the purpose of making a composition which is laid as a composition or for the purpose of coating individual pieces of the earthy, stony, or mineral ingredients, either in place or out of place.

The asphalt cement may constitute a portion of any part of the pavement, either the subbase, base, intermediate layers, or surfacing, or may enter into the composition of all. By "pavement" I mean any artificial surfacing in the nature of a roadway, gutter, sidewalk, floor, or similar surfacing. I would further add that my improved asphalt cement alone or my improved mastic may be used to form a thin surfacing to a Macadam, Telford, or any other new or old pavement, or to improving or renewing the surfacing of worn or old pavement of any kind, and I would not be understood as indicating by these uses that I confine the employment of the invention to any type, form, or use of pavement, as it has a much broader range of use than have the old asphalt cements, mastics, and pavements.

In use when the cement, mastic, or paving composition is spread in relatively thin layers, as in a pavement or surfacing, by which large areas become exposed to the air, and therefore to influences favorable to rapid evaporation of the temporary liquefier, the cement, mastic, or composition will stiffen and harden and become fixed with a rapidity which depends upon the amount of the temporary liquefier and fixer used in the cement, mastic, or composition.

In the manufacture of the cement, mastic, or composition a low or moderate degree of heat may be employed, or it may be manufactured at atmospheric temperature, according to the use to which it is to be put or the degree of fluidity which it should have at atmospheric temperature.

On account of the softness or fluidity of my improved cement and because the time in which it hardens is longer it may be more intimately mixed with the ingredients of the mastics and of the paving compositions than where such incorporation takes place under a high temperature, and there is therefore imparted to the mastic and paving compositions greater advantages and power to permanently combine the earthy and mineral particles together and permit them to be compacted into a denser structure than would otherwise be possible, and these results provide the pavement with greater strength and greater wearing properties than are possessed by the old types of asphalt pavements.

Having thus fully described my invention, I claim and desire to secure by Letters Patent of the United States—

1. A paving mixture having a cement for permanently uniting and binding together the mineral or wearing ingredients, and adapted for that purpose without material change in its composition or physical condition prior to the completion of the laying of the pavement, which consists of a plastic asphaltum provided with heavy permanent oils, in combination with a light temporary oil.

2. A paving mixture having a cement for permanently uniting and binding together the mineral or wearing ingredients, and adapted for that purpose without material change in its composition or physical condition prior to the completion of the laying of the pavement, which consists of a plastic bituminous matter such as is provided with heavy permanent oils, in combination with a light temporary mineral oil.

3. A paving mixture having a cement for permanently uniting and binding together the mineral or wearing ingredients, and adapted for that purpose without material change in its composition or physical condition prior to the completion of the laying of the pavement, which consists of a plastic asphaltum such as is provided with heavy permanent oils, in combination with temporary oils, having the characteristics of naphtha, benzin, &c.

4. A paving mixture having a cement for permanently uniting and binding together the mineral or wearing ingredients, and adapted for that purpose without material change in its composition or physical condition prior to the completion of the laying of the pavement, which consists of a plastic asphaltum such as is provided with heavy permanent oils, in combination with a light temporary oil maintaining the whole fluid at temperatures as low as atmospherical.

5. A composition for use in the laying of foundation-pavements, &c., comprising a mixture of asphalt, a permanent combining flux, a volatile liquefier and fixer and particles of earthy, stony or mineral matter or a combination of them.

6. An asphalt cement or composition for use in the construction of asphalt pavements and the like comprising a mixture of asphalt, a permanent combining agent or flux, and a temporary liquefier and fixer, which latter is held combined in the mixture until it is used and while it is being associated with other ingredients and also while the resulting composition is being laid in a pavement or other form, whereby the temperature at which such association may take place and said pavement laid is rendered normal or low and whereby also the escape of the temporary liquefier then hardens the mixture in its permanent place.

7. An asphalt mixture for forming pavements, sidewalks and similar structures or portions thereof and for permitting them to be laid at a low or normal temperature comprising a composition of asphalt, a permanent combining flux, a temporary liquefier and fixer, and earthy or mineral ingredients all intimately associated and rendered plastic by the temporary liquefier and fixer at a low or normal temperature.

8. A composition for use in laying pavements, sidewalks and similar structures or portions thereof comprising a mixture of asphalt, a permanent combining flux, earthy, stony or mineral matter, or a combination of them, and a temporary liquefier and fixer which forms a part of the mixture while it is being prepared and while it is being laid in permanent form and which acts first to render the mixture plastic enough to be worked at ordinary or low temperatures and then by evaporation to harden the mixture in place.

FREDERICK J. WARREN.

In presence of—
A. DEVEREAUX,
J. WELSH.